(12) United States Patent
Rivas Alvarez

(10) Patent No.: US 8,279,579 B1
(45) Date of Patent: Oct. 2, 2012

(54) ENERGY TRANSFORMING, STORING AND SHIELDING DEVICES

(76) Inventor: Victor Rivas Alvarez, Lincoln, NE (US)

(*) Notice: Subject to any disclaimer, the term of this patent is extended or adjusted under 35 U.S.C. 154(b) by 814 days.

(21) Appl. No.: 12/316,252

(22) Filed: Dec. 10, 2008

Related U.S. Application Data

(60) Provisional application No. 61/005,976, filed on Dec. 10, 2007, provisional application No. 61/005,996, filed on Dec. 10, 2007.

(51) Int. Cl.
  *H01G 9/00* (2006.01)
(52) U.S. Cl. ........ 361/502; 361/503; 361/504; 361/512; 361/517; 361/519
(58) Field of Classification Search ............ 219/121.69, 219/121.68, 121.67, 121.76, 121.83; 361/502, 361/503–504, 509–512, 516–519
  See application file for complete search history.

(56) References Cited

U.S. PATENT DOCUMENTS

| | | | | |
|---|---|---|---|---|
| 6,878,900 B2 * | 4/2005 | Corkum et al. | ........... | 219/121.69 |
| 7,053,351 B2 * | 5/2006 | Li et al. | ........... | 250/201.3 |
| 7,960,261 B2 * | 6/2011 | Omata | ........... | 438/487 |
| 8,026,459 B2 * | 9/2011 | Tanaka et al. | ........... | 219/121.69 |

* cited by examiner

*Primary Examiner* — Nguyen T Ha
(74) *Attorney, Agent, or Firm* — James Creighton Wray

(57) ABSTRACT

Electronic components and electrodes for transforming, storing and shielding devices have ablated femtosecond pulsed laser machined with developed nano structures for substantially increasing surface areas. Storage is multiplied in capacitors and supercapacitors, and small sizes have increased capacity. Supercapacitor heating upon charging and discharging is reduced by femtosecond pulsed laser ablation of inner and outer surfaces of cases. Battery storage capacity and charging time, fuel cell size and capacity, hydrogen generation and storage and seconds are improved by femtosecond pulsed laser machining ablation of electrode surfaces followed by chemical vapor deposition of carbon nano structures.

17 Claims, 29 Drawing Sheets

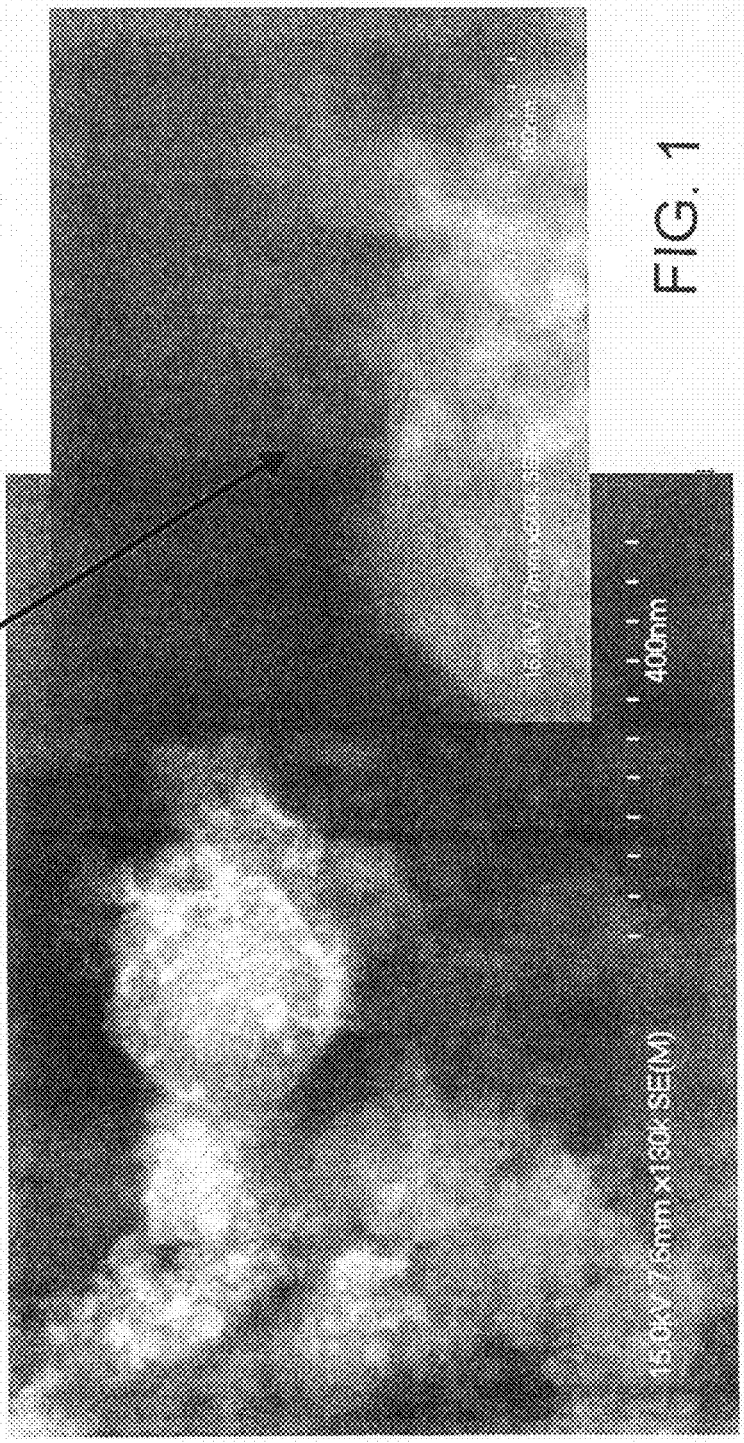

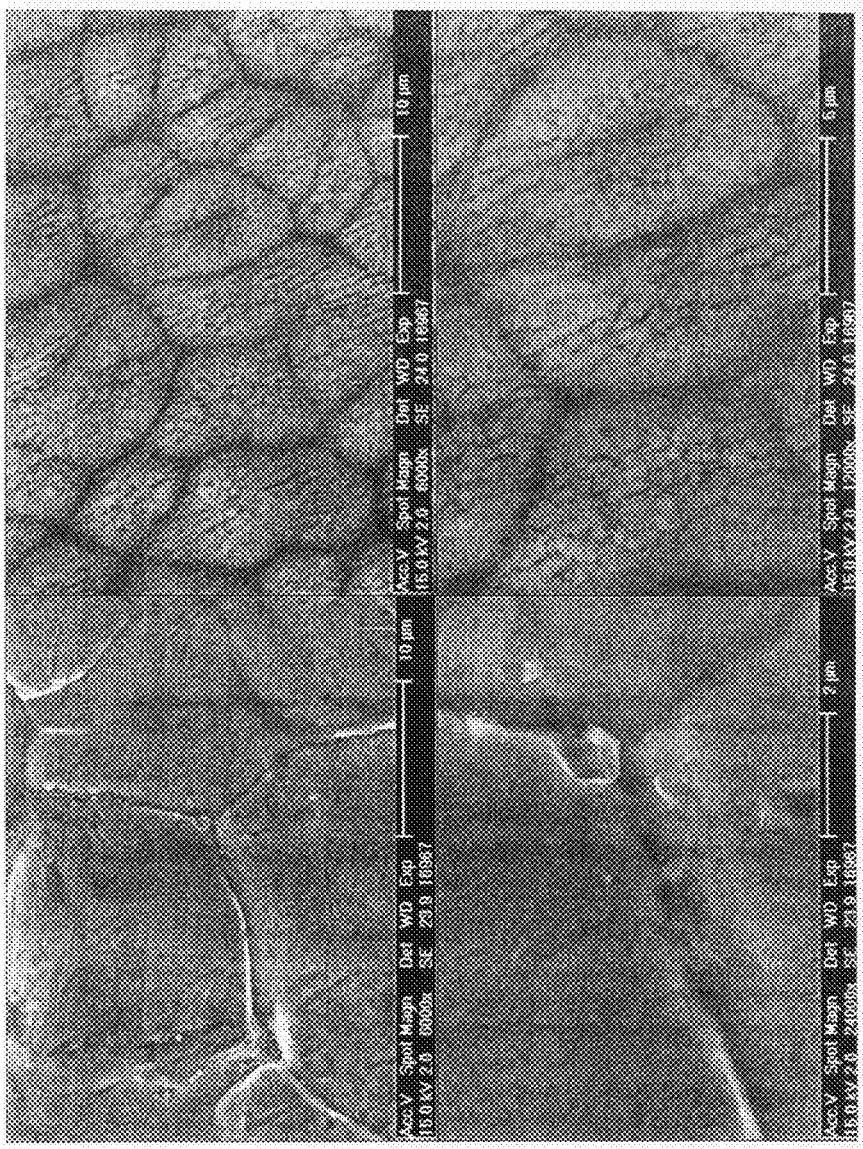

FIG. 2
SEM Images of Stainless Steel Before and After Laser Machining

- Images on the left show the metal surface before being machined by the femtosecond laser.
- The images on the right show the nano and micro surfaces that have been created by the laser machining process.
- The "fuzzy" appearance of the micro structures in the images on the right is due to the nano surface structures that have been formed by laser machining.

Advantages of Femtosecond Pulses

| Femtosecond vs. Nanosecond | Description of Plasma Formation |
|---|---|
| • Nanosecond do not create the unique nano surface structures. | • In the first 100 fs electron heating and thermalization occurs. |
| • Nanosecond pulses create large amounts of heating damage in the form of melting splatter and stress cracking. | • It takes a few ps for the hot electron gas to cool and energy to transfer to the material lattice. |
| • Femtosecond pulses arrive before the material plasma has time to form. | • After tens of ps thermal diffusion into the sample bulk takes place. |
| • Femtosecond pulses have improved repeatability over nanosecond pulses. | • After nanoseconds the onset of thermal melting and ablation occurs. |

FIG. 8

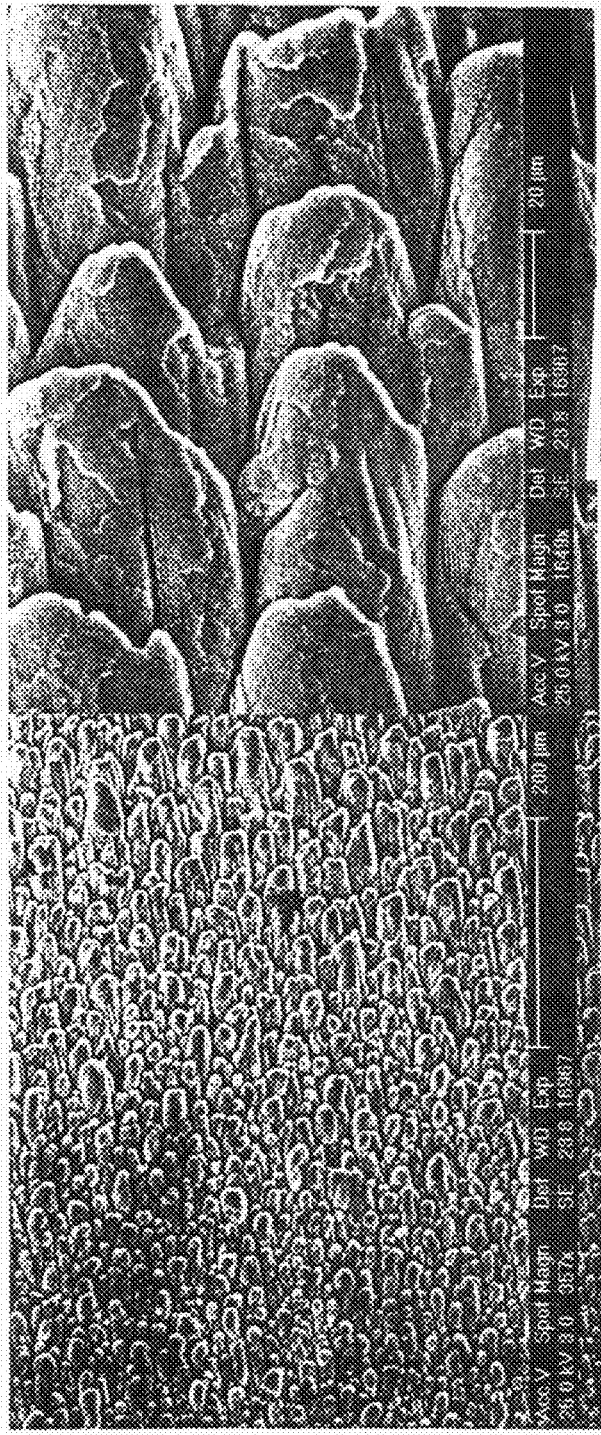

Typical black surface produced on gold (left) and aluminum alloy (right). Emissivity changes from 0.02 to 0.95.
FIG. 10A  FIG. 10B
- The lack of an oxide layer on the gold sample demonstrates that the blackening of gold is due to the nano and micro structures produces by the femtosecond laser machining.
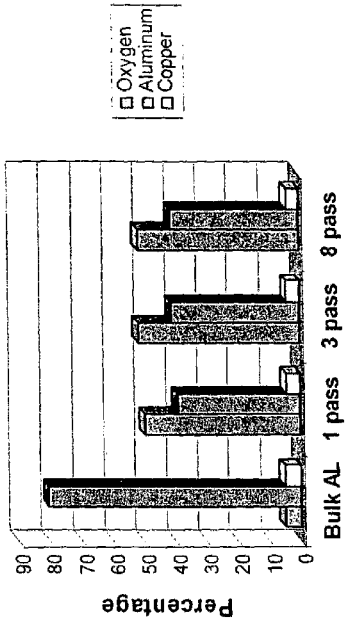
FIG. 11A
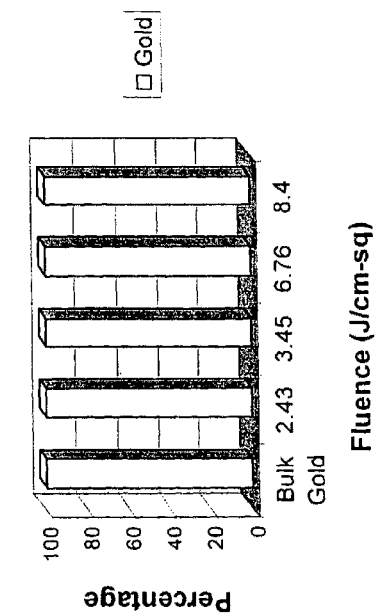
FIG. 11B
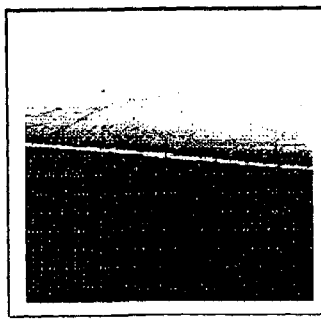
Research funded by: Riva's Technology International Incorporated

Reflectance of Aluminum
Sample ablated at fluence = 12.201 J/cm²

Low reflectance even in IR

Research funded by:
Riva's Technology International Incorporated

SEM Micrographs and Reflective Properties of Aluminum Machined With a Femtosecond Laser Samples ablated with different number of passes at fluence of: (F) = 13.468 J/cm²

1 pass (60° view)
3 pass (60° view)
4 pass (30° view)
8 pass (45° view)

Reflectance of Al surface after laser machining.

Research funded by:
Riva's Technology International Incorporated

Pre/Post Nanostructuring Weights

| Sample Number | Weight Before Blackening (mg) | Weight After Blackening (mg) | Change in Weight (mg) |
|---|---|---|---|
| 1 | 2514.7 | 2475.1 | 39.6 |
| 2 | 2468.4 | 2414.5 | 53.9 |
| 3 | 2608.1 | 2551.2 | 56.9 |
| 4 | 2464.8 | 2396.1 | 68.7 |

FIG. 20

Laser Nano-structuring of Super Capacitor Electrodes

- Single pass nano-structuring of the surface produces a 21 times increase in capacitance for gold samples
- Electrical current method for determining surface area gives a corresponding increase in surface area of 28 times for nano-structured gold samples
- Good correlation between super capacitor increase and area increase for gold
- Nano-structuring of aluminum produces what appears to be greater increase in the surface area by SEM image comparison
- Need to perform measurements using current method to determine the area or make a capacitor and compare the value of capacitance (gives a pretty good idea of the area increase for gold)
- Optimization of the process is now very important

FIG. 30

Competing Technology: Nano-Surface vs. Nano-Tubes/Nano-Wires

170

173 — Nano-Tubes/Nano-Wires
- Advantage
  - high electrical conductivity
  - high mechanical strength
  - large surface area/network
  - chemical resistance
- Disadvantage
  - very high cost
  - at present not commercially viable 171 — Nano-Surface
- Advantage
  - preserves chemical properties
  - high surface area
  - high emissivity
  - material independent
  - high throughput potential = commercial potential
- Disadvantage
  - lack of awareness of technology potential

FIG. 31

Applications

180

Current Application Development:

- Micro Processor
  - Improved power dissipation for better heat management

- 1 mm Thick Alloy
  - Increased electrode surface are for hydrogen production.

- Plastic Graphite Composite
  - Increased surface area for super capacitor electrode.
  -

- Carbon Film On Aluminum Foil Substrate
  - Increase surface area to improve capacitance of a supper capacitor.
  - Infrared laser power detectors.
  -

- Activated Carbon
  - Increase surface area of activated carbons used in supper capacitors.

- Polymer Film On A Plastic Substrate
  - Enhanced surface are for the detection of chemical and biological agents.

- Bulk Aluminum
  - Improved power dissipation for better heat management of laser diodes.

FIG. 32

ENERGY TRANSFORMING, STORING AND SHIELDING DEVICES

This application claims the benefit of U.S. Provisional Application No. 61/005,976, filed Dec. 10, 2007 and U.S. Provisional Application No. 61/005,996, filed Dec. 10, 2007, which are hereby incorporated by reference in their entireties.

SUMMARY OF THE INVENTION

This invention provides new nano machined electronic energy transforming, receiving, storing, releasing and shielding devices, electrodes and materials produced by ablating surfaces and increasing surface areas using femtosecond pulsed laser technology. Better capacitors and supercapacitors are created. Batteries are enhanced by increasing surface areas of electrodes and collectors for increasing capacities and reducing sizes compared to capacities.

This invention provides improved energy storage devices, processed by increasing surface areas with femtosecond pulsed laser energy. Activated carbons, metals and other materials are used in electrode supercapacitors and other capacitors. The activated carbon, metal and other charge storage surfaces are ablated by femtosecond pulsed lasers, increasing surface areas and storage capacity.

Femtosecond pulse laser technology machined surface areas of the current collectors and electrodes makes both current collectors and electrodes with high surface areas.

Activated carbons in superconductors may be replaced by other femtosecond pulsed laser ablated materials. The femtosecond pulsed laser ablated materials may be augmented or alternated with chemical vapor deposited activated carbon nano tubes and nano-structures. Curved surfaces of capacitors and storage batteries may be augmented with chemical vapor deposited surface enhancements such as nano tubes, nano wires and nano particles, while flat surfaces of the capacitors may be ablated and enhanced with the surface area increases produced by femtosecond pulsed laser ablating. Nano machined surfaces have material removed and divided by ablating. Chemical vapor deposition grows surfaces and adds nano tubes, nano wires and nano particles.

The femtosecond pulsed lasers ablate the surfaces without heating adjacent areas to softening, flowing and smearing or recrystallization temperatures. Electronic and electrical equipment producing companies in the energy storing field may find the invention useful.

The invention provides enhanced surface areas for electromagnetic interference (EMI) shielding through the use of femtosecond pulsed lasers. New improved electromagnetic interference (EMI) shielding, electrostatic discharge and broadband detectors are similarly produced. The invention replaces traditional EMI shielding technologies, e.g. conductive paint, coatings, fillers, conductive powders and conductive filaments. Femtosecond pulsed laser enhanced surface areas for EMI shielding and electrostatic discharge broadband detectors are improved by factors up to 1,000 times or more.

The invention uses directly femtosecond pulsed laser machined surfaces. The invention also uses machined and die cuts foils on release sheets to peel off and place on processors or other electronic surfaces. Surfaces are machined to improve EMI shielding.

Femtosecond machined surfaces used in space make invisible satellites. The femtosecond pulsed laser enhanced surfaces absorb and do not reflect incoming wave energy.

Nano-machining increases surface area and increases absorption and emissivity up to 1,000 times or more. The invention provides more efficient use of surfaces on electrodes and in shielding and electronic devices.

The nano-machined surfaces shield electronics from interferences from broadcast energy and from lower power energy from adjacent components. At the same time the nano-machined surfaces reduce heat and facilitate element packing in the parts by improving heat radiation.

As an example, fluorescent light electrodes are provided with more surface area and less material to create and sustain arcs.

Using the invention, a material having 1 square inch may equal 1,000 square inches of surface area. The minute nano size surface disruptions provide reduced reflectivity adsorb, absorb and store energy and dissipate heat. The femtosecond pulsed lasers use $10^{-15}$ sec. laser pulses to produce, among other things, supercapacitors, microprocessors, shielded electronics, environmental, chemical, biological and biomed sensors, capacitors and batteries.

Energy situations in every country require better power usage. Lighting bulbs and tubes more efficiently reduce power requirements, increase lumens and make products last longer. Femtosecond pulsed laser technology sculptures materials, producing enhanced surface areas to release wave energy. Femtosecond lasers form nano-surface variations in calibrated depths and widths in metals, foils, and plastics to increase areas by surface sculpturing.

The new invention creates nano-surfaces for heat, EMI (electromagnetic interference), and power management in electronics. The new nano-machined metallic and nonmetallic materials are machined using femtosecond pulsed lasers.

Applications of nano surfaces formed with femtosecond pulsed lasers include improved heat, EMI and power management for energy storage in batteries, supercapacitors and solar cells and in infrared, biomedical, chemical, process and environmental sensors.

Heat loss in terms of infrared light and wave energy may be described by:

Radiated power: $P = eoAT4$ $e$ = emissivity, $a$ = universal constant, $A$ = area, $T$ = temperature in Kelvin (273° K=0° C.) Emissivity relates the radiated power to that of a blackbody, which is a perfect emitter and absorber with $e=1$. Increased area results in increased radiated power. Temperature is raised to the fourth power indicating that a small temperature increase results in a large increase in radiated power.

The invention provides improvements by increasing surface areas of electronic components.

These and further and other objects and features of the invention are apparent in the disclosure, which includes the above and ongoing written specification, with the claims and the drawings.

BRIEF DESCRIPTION OF THE DRAWINGS

FIG. 1 shows nano surfaces on a stainless steel which were formed with femtosecond laser machining.

FIG. 2 shows SEM images of stainless steel before and after laser machining.

FIG. 8 is a chart of advantages of femtosecond pulses.

FIGS. 9A and 9B show an aluminum surface nano-machined at a 45° angle at 357 times magnification in FIG. 9A and 1649 times magnification in FIG. 9B.

FIGS. 10A and 10B show a nano-machined area on gold and aluminum alloy respectively.

FIGS. 11A and 11B show comparison of elemental composition upon ablation on gold and aluminum alloy respectively.

FIG. 20 is a chart of a pre and post processing sample weights.

FIG. 30 is a chart of advantages of femtosecond pulsed laser machining of supercapacitor electrodes.

FIG. 31 is a chart comparing femtosecond pulsed laser machined nano surfaces with nano tubes and wires.

FIG. 32 is a chart of femtosecond pulsed laser applications for electronic components.

DETAILED DESCRIPTION OF THE PREFERRED EMBODIMENTS

Figure 3:
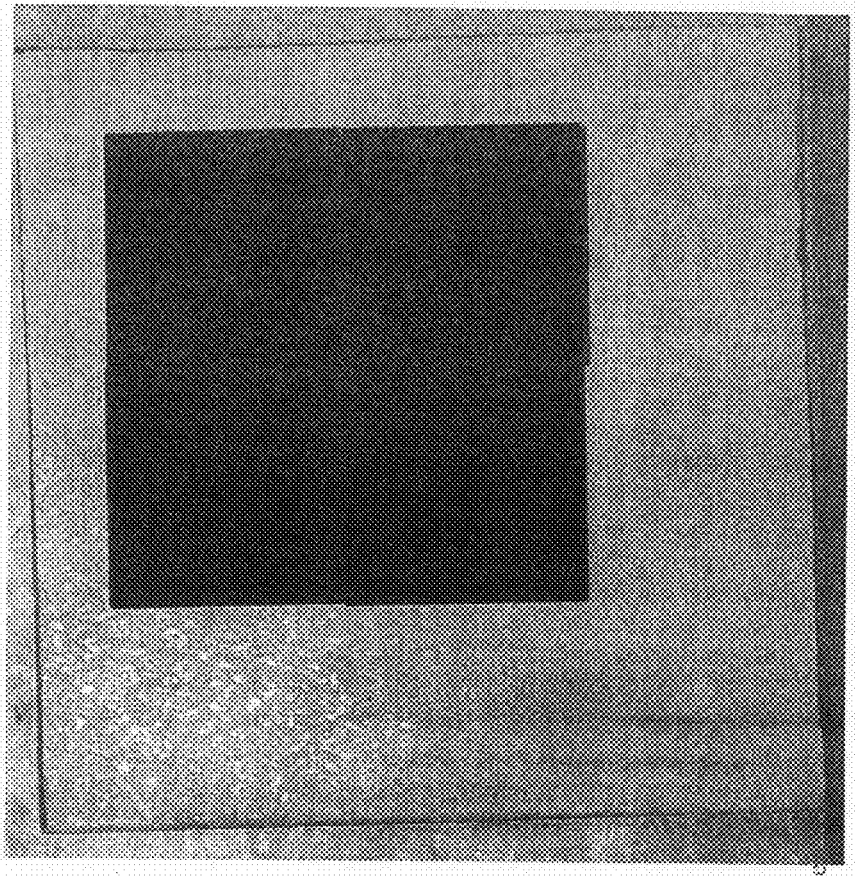
FIG. 3 shows a stainless steel square with a central femtosecond laser machined center.

FIG. 1 shows nano surfaces 1 on stainless steel 3 which were formed with femtosecond laser machining. SEM (scanning electron microscope) images shows the nano structures 5 that were formed by the femtosecond laser machining. The image on the right shows ablated lines that are less than 10 nm wide. The image on the left shows a scale of 400 nm. The image on the right shows a reference scale of 100 nanometers.

FIG. 2 shows SEM images of stainless steel before and after laser machining. Images on the left show the metal surface 5 with 10 micrometer and 2 micrometer scales, respectively, before being machined by the femtosecond pulsed laser. The images on the right show the nano and micro surface irregularities 11, 13 that have been created by the femtosecond pulsed laser machining process. The fuzzy appearance of the micro structures in the images on the right shows the nano surface structures 15 that have been formed by the femtosecond pulsed laser machining.

FIG. 3 shows a stainless steel 21 square with a central femtosecond pulsed laser machined center 23. A 1 inch square 23 was machined into a 2 inch square stainless steel sample 21. The only optimization performed was of one parameter (distance between sample and focusing lens) to achieve the blackest surface possible.

Figure 4:
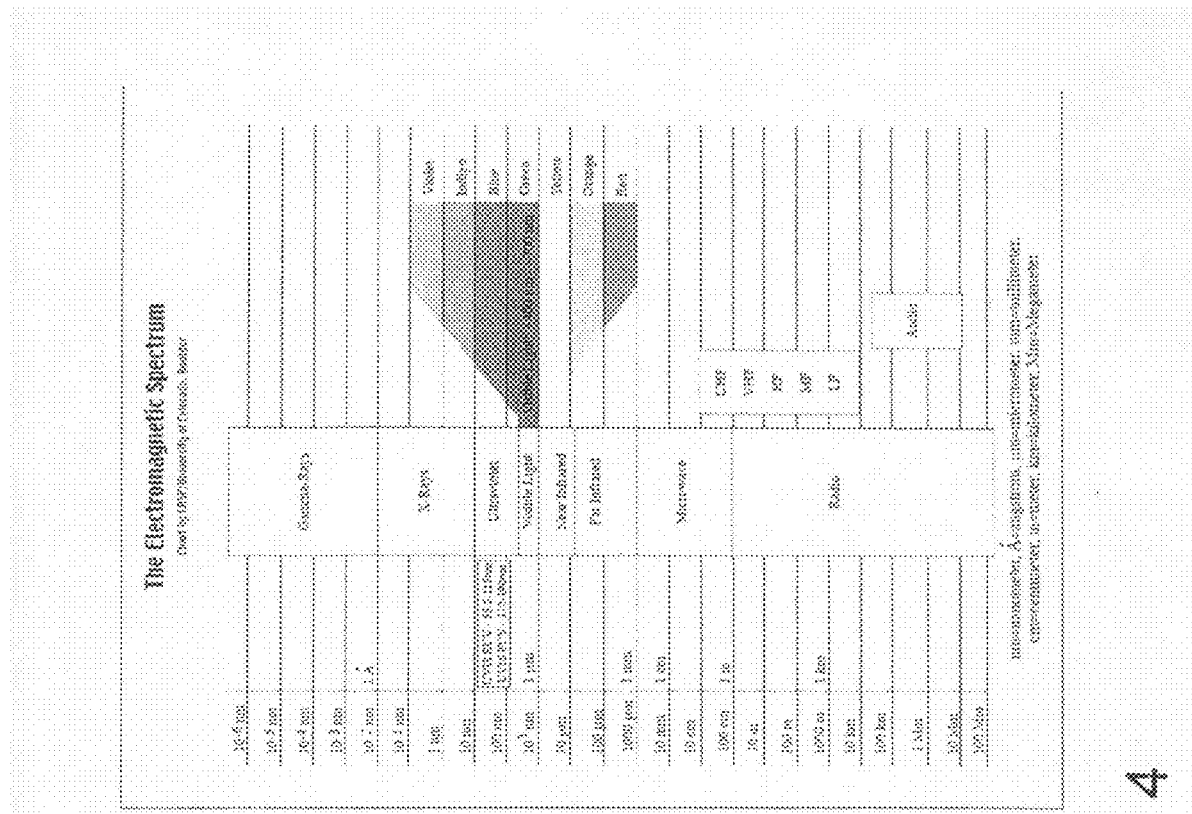
FIG. 4 shows infrared wavelengths in the electromagnetic spectrum.

FIG. 4 shows infrared wavelengths in the electromagnetic spectrum. All objects emit light of different wavelength depending on their temperature. Objects at room temperature radiate in the IR. IR wavelength is 1 μm to 1000 μm. Objects begin to glow red when their temperatures begin to approach 1,112° F.

Figure 5:
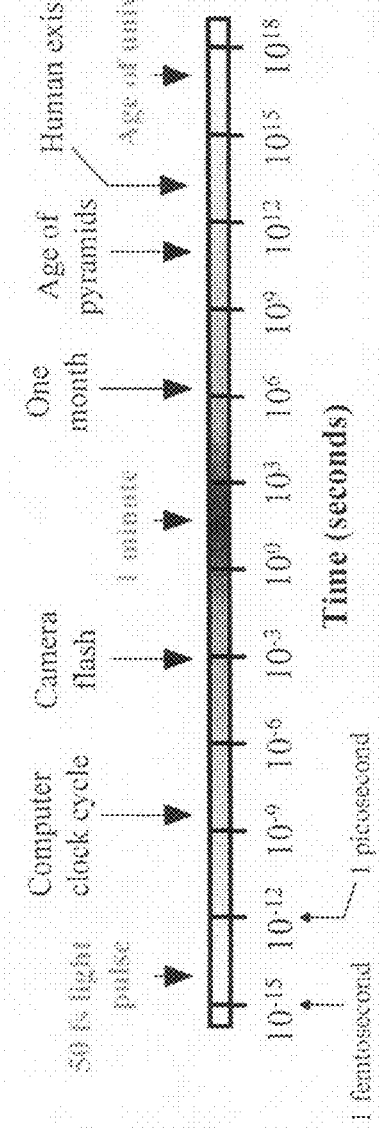
FIG. 5 shows time scale relationships of femtoseconds.

FIG. 5 shows time scale relationships of femtoseconds to time in general.

Figure 6:
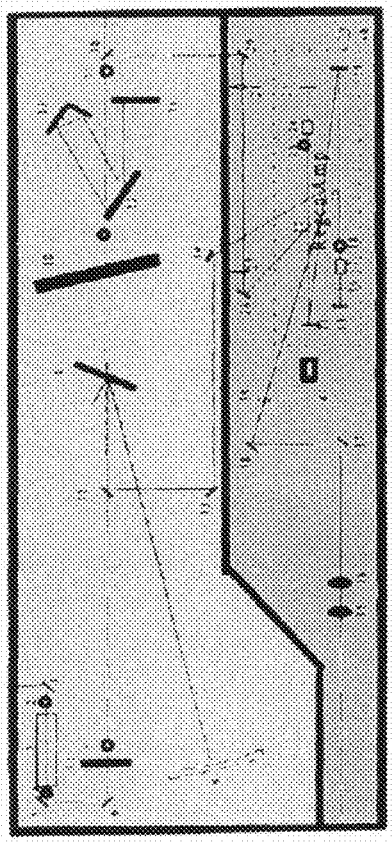
FIG. 6 shows a femtosecond laser regenerative amplifier diagram.

FIG. 6 shows a femtosecond laser regenerative amplifier diagram. The femtosecond pulsed laser has a pulse width of 50 femtoseconds, a wavelength of 780-820 nm, a beam diameter of 7 mm and an energy pulse of 750 μm at an average power of 750 mw.

Figure 7:
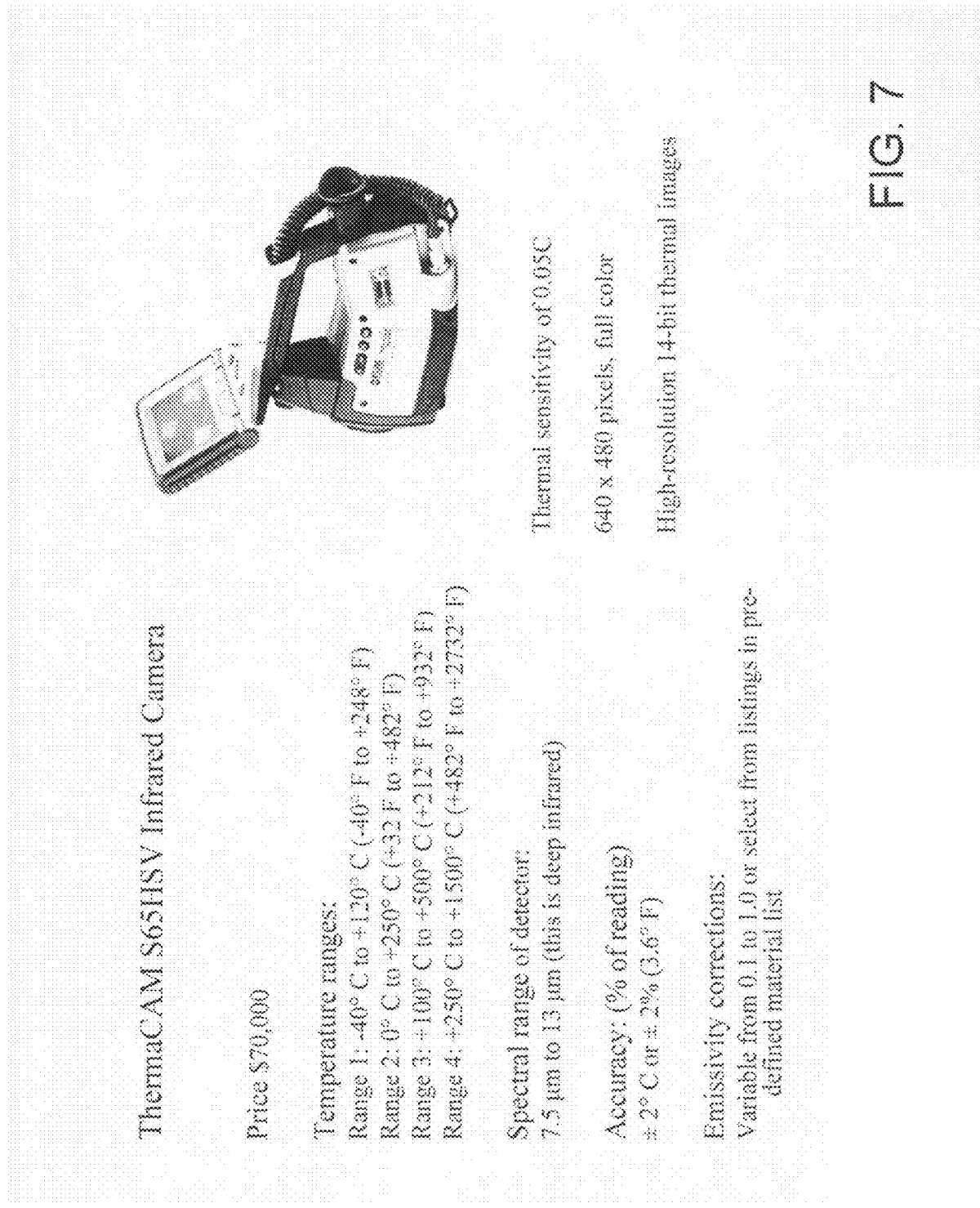
FIG. 7 shows an infrared camera and its specifications used in the studies.

FIG. 7 shows an infrared camera and its specifications. The infrared camera was used in photographing and measuring the samples.

FIG. 8 is a chart of advantages of femtosecond pulses. Advantages of femtosecond pulses are as follows: Nanosecond pulses do not create the unique nano surface structures. Nanosecond pulses create large amounts of heating damage in the form of melting, splatter and stress cracking. Femtosecond pulses stop before the material plasma has time to form. Femtosecond pulses have improved repeatability over nanosecond pulses. Description of plasma formation during the pulses: In the first 100 femtoseconds electron heating and thermalization occurs. It takes a few picoseconds for the hot electron gas to cool and energy to transfer to the material lattice. After tens of picoseconds thermal diffusion into the sample bulk takes place. After nanoseconds the onset of thermal melting and ablation occurs.

FIGS. 9A and 9B show an aluminum surface nano-machined at a 45° angle at 357 times magnification in FIG. 9A and 1649 times magnification in FIG. 9B. In the images the laser machining was performed with an aluminum sample at a 45° angle with respect to the incident femtosecond pulsed laser. The machined surface has a "fish scale" appearance. The angle of laser machining is used for different applications in electrodes: drag reduction, stealth technology, broadband detectors, supercapacitors, batteries and radiative cooling.

FIGS. 10A and 10B show a typical black surface 31 produced by femtosecond pulsed laser machining on a gold and aluminum alloy sample 30. Emissivity changes from 0.02 to 0.95. The lack of an oxide layer on the gold sample demonstrates that the blackening of gold is due to the nano 15 and micro structures 11, 13 produced by the femtosecond laser machining.

FIGS. 11A and 11B show comparison of elemental composition upon ablation.

Figure 12A:
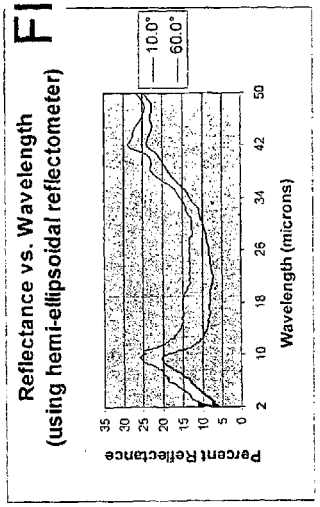
FIGS. 12A, 12B and 12C show the reflectance of aluminum.
Figure 12C:
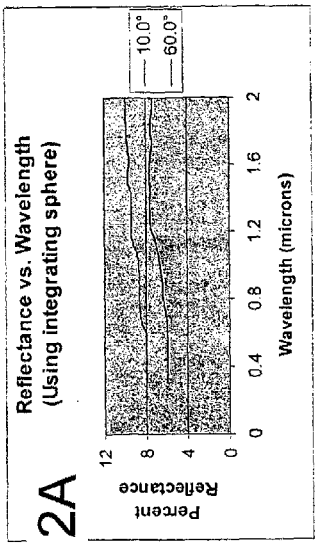
Figure 12B:
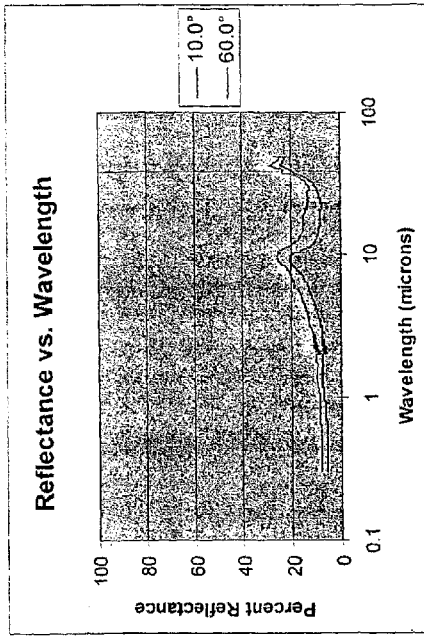

FIGS. 12A, 12B and 12C show the reflectance of aluminum on an aluminum sample ablated at fluence=12.201 J/cm2.

Figure 13:
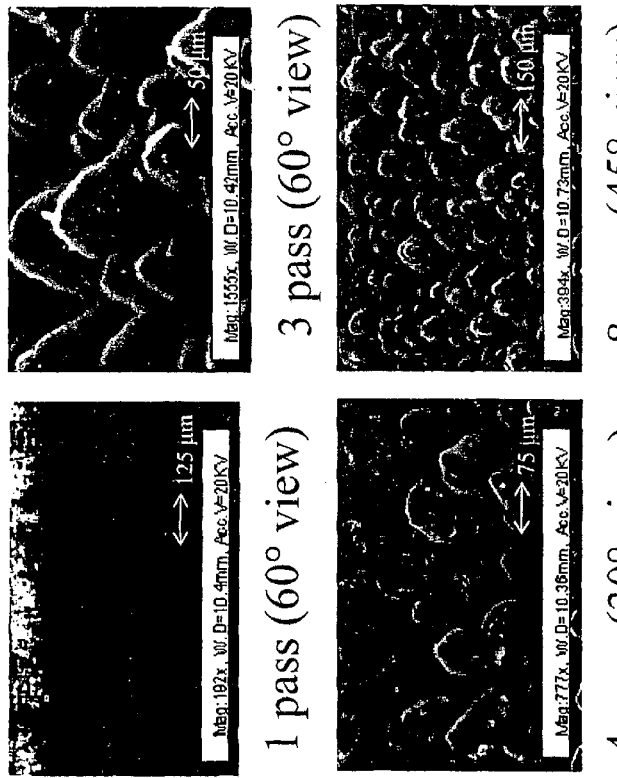
FIG. 13 shows scanning electron micrographs and reflective properties of aluminum machined with a femtosecond laser.

FIG. 13 shows SEM micrographs and shows reflective properties of aluminum machined with a femtosecond pulsed laser for different numbers of passes. The samples were ablated with different number of passes at fluence of:

(F)=13.468 J/cm2. The average power was 750 mW. The pulse repetition rate was 1 kHz. The pulse width was less than 50 fs at a wavelength of 780-820 nm and with a beam diameter of 7 mm. Energy per pulse was 750-.μJ. Energy stability had less than 1% variation. The spatial model was $TEM_{00}$. Polarization was linear and horizontal.

The micrograph after one pass was a 60 degree view which shows low reflectance. A scale shows a distance of 125 μm at a magnification of 192×. The next micrograph 43 shows in a 60 degree view nano formations 44 on the surface, with a reference scale showing 50 μm at a magnification of 1,555×. Micrograph 45 shows the sample after four passes. Magnification is 77× and a distance of 75 μm is shown. Micrometer sized ablation is shown. Micrograph taken at 45° and 394× magnification and showing a 150 μm scale shows many ablations after eight passes.

Figure 14:
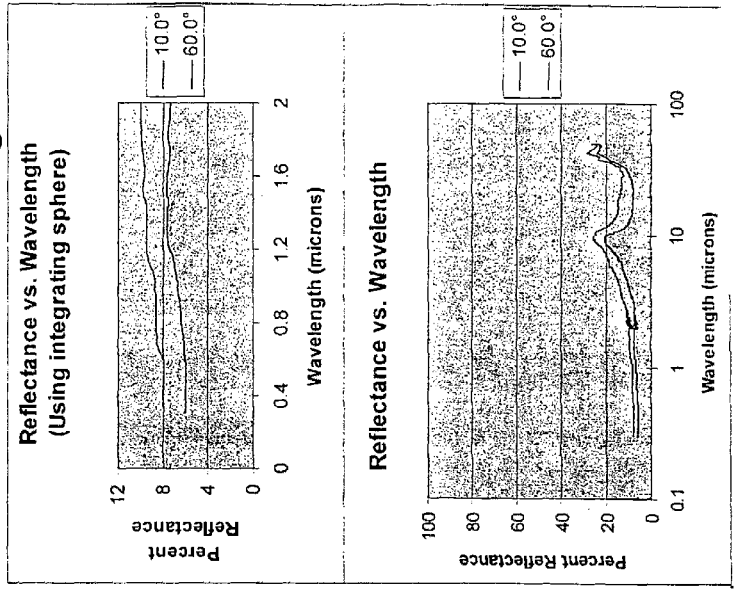
FIG. 14 shows scanning electron micrographs and reflective properties of aluminum machined with a femtosecond laser.

FIG. 14 shows reflectance of an aluminum surface after laser machining. The top chart shows a plot 51 of percent reflectance versus wavelength in microns. The bottom chart shows a plot 53 of percent reflectance versus wavelengths in microns in larger ranges.

Figure 15:
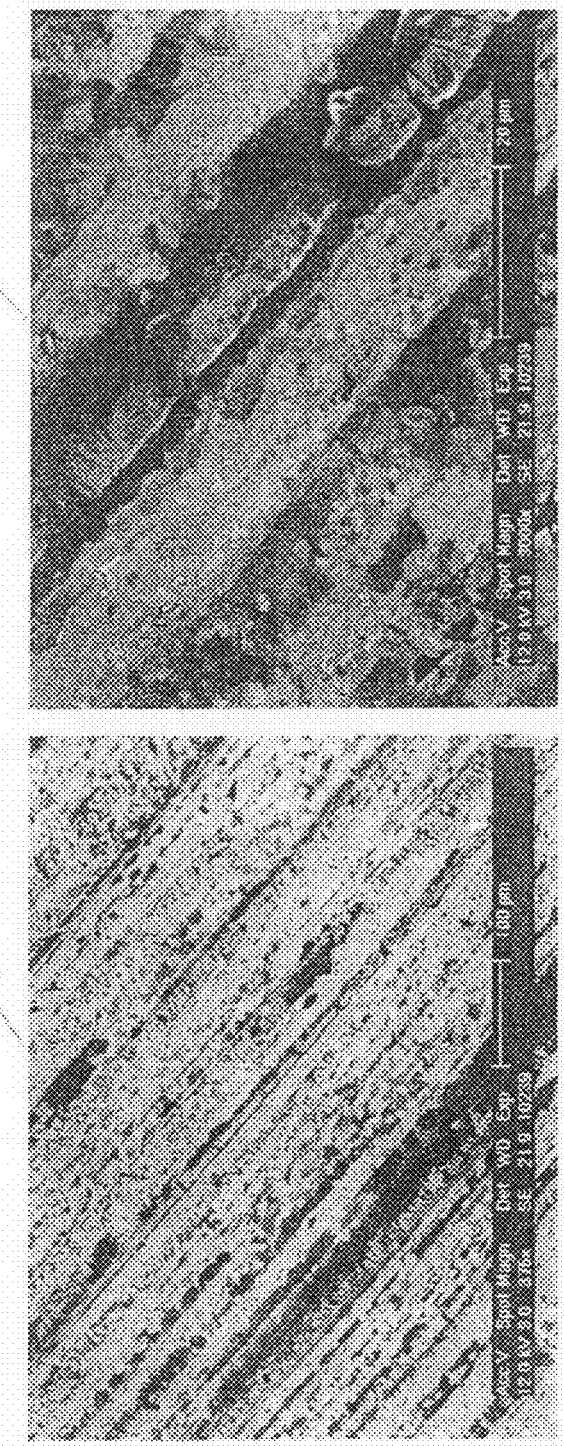
FIG. 15 shows SEM images of pre-processed aluminum.
Figure 16:
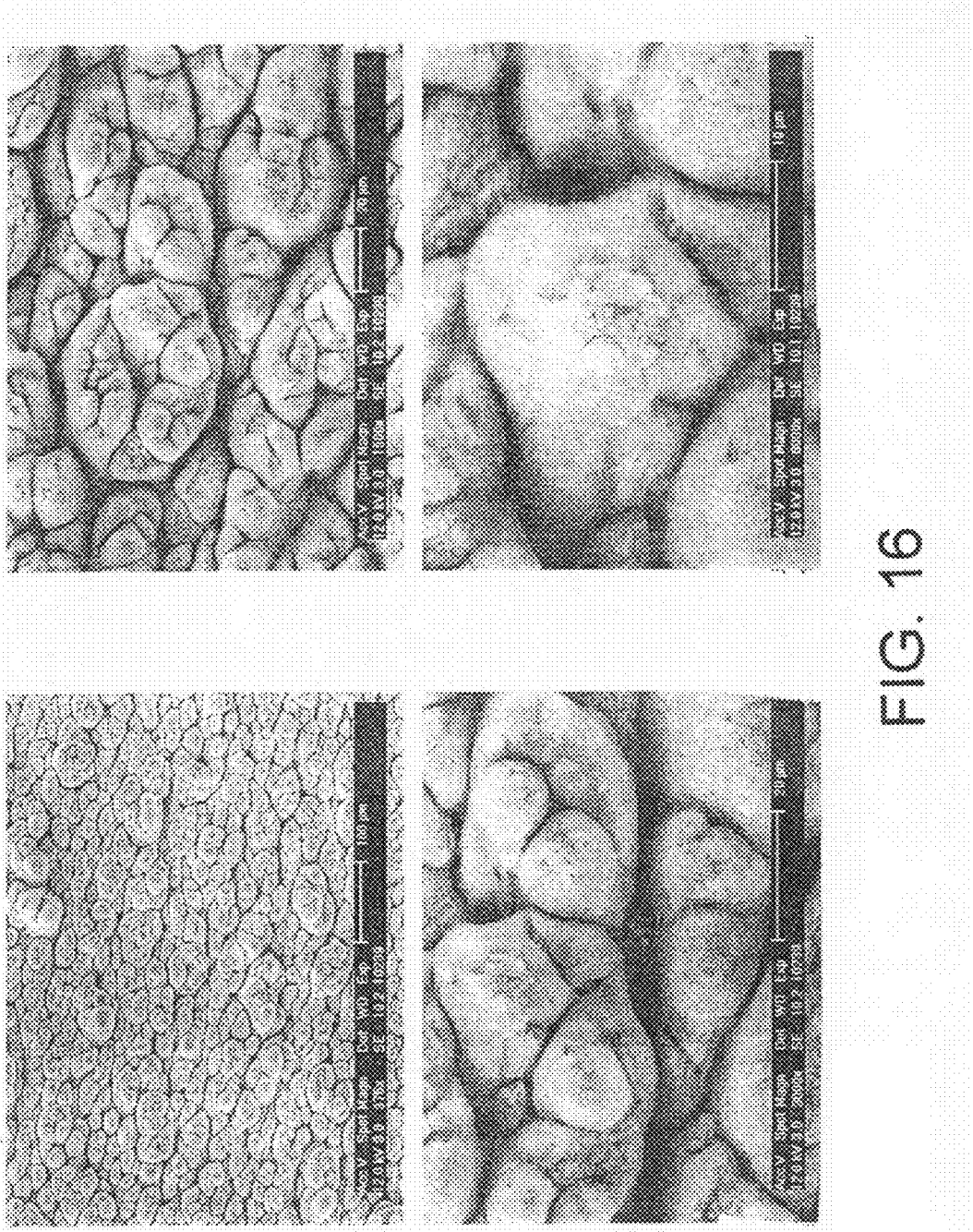
FIG. 16 shows SEM images of varied magnification of femtosecond pulsed laser processed aluminum in Sample 1.
Figure 17:
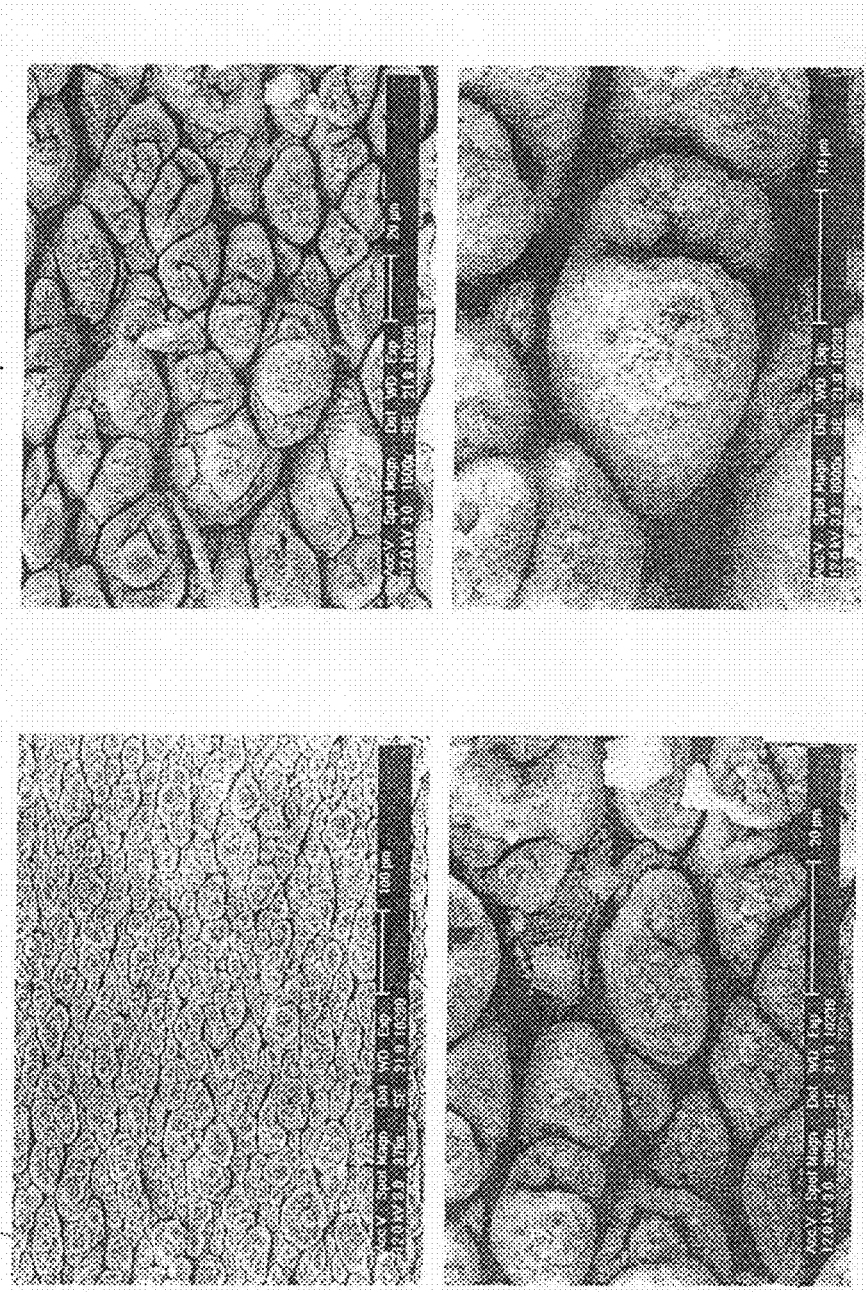
FIG. 17 shows SEM images of varied magnification of femtosecond pulsed laser processed aluminum in sample 2.
Figure 18:
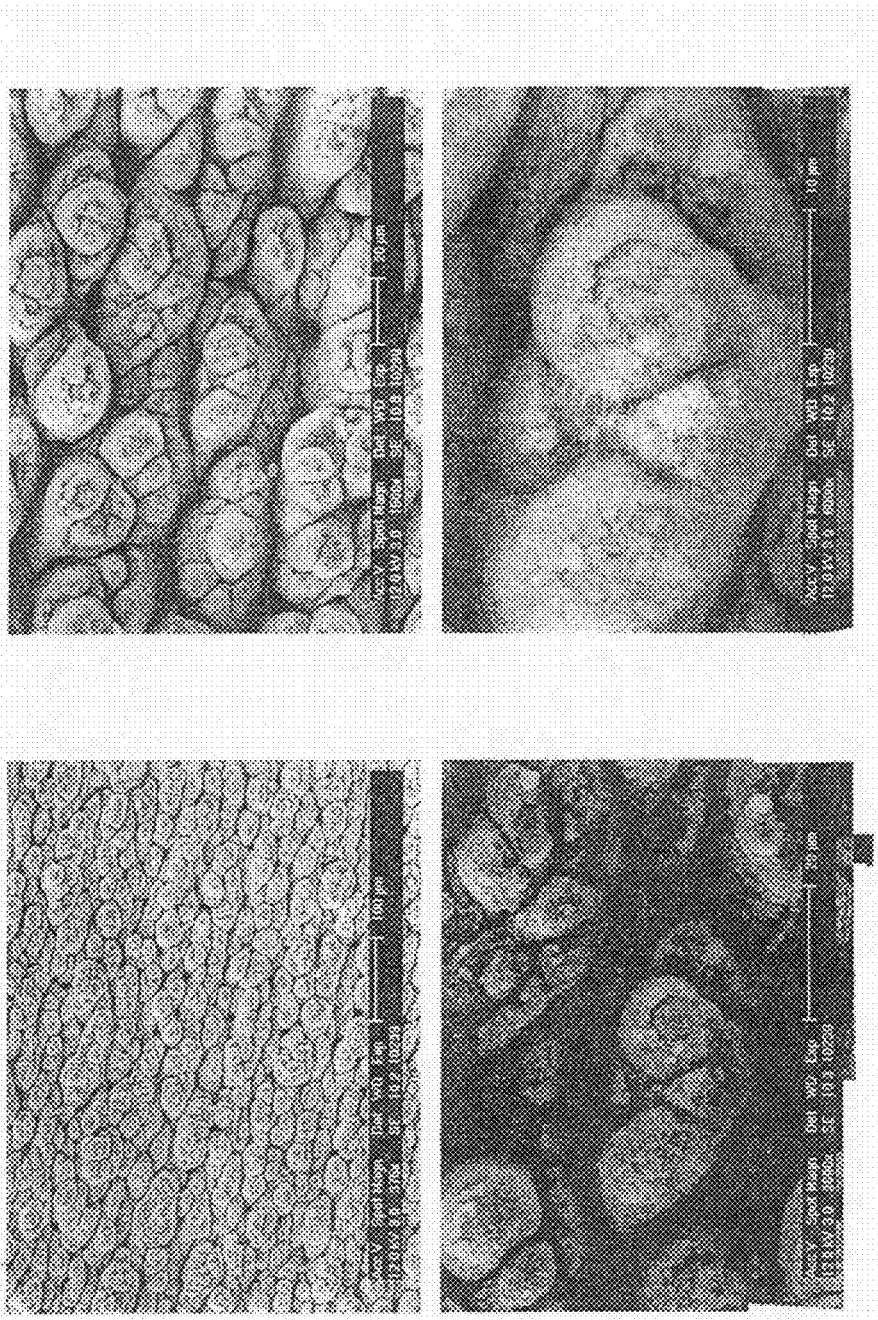
FIG. 18 shows SEM images of varied magnification of femtosecond pulsed laser processed aluminum in sample 3.
Figure 19:
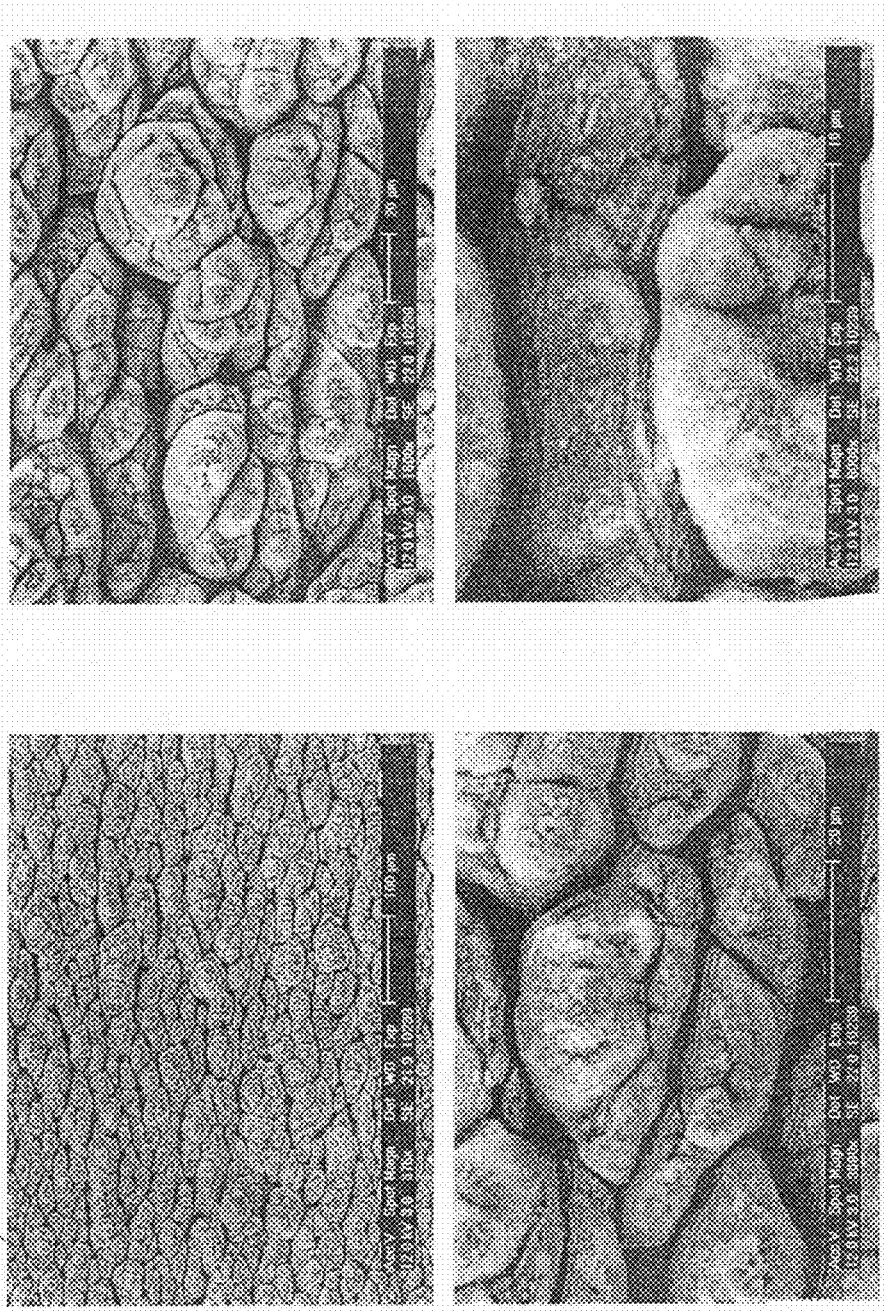
FIG. 19 shows SEM images of varied magnification of femtosecond pulsed laser processed aluminum in sample 4.

In FIG. 15 image 60 was taken at 375× magnification. Image 61 was taken at 3000× magnification. For comparison scales are marked at 100 μm and 20 μm, respectively.

FIGS. 16-19 show four different aluminum samples 63, 65, 67, 69 after femtosecond pulsed laser machining at four different magnifications, 375×, 1500×, 3000× and 6000×. For comparison in each sample three different scale lengths are shown, 100 μm, 20 μm and 10 μm.

FIG. 20 shows in the last column 74 of chart 70 the weight loss due to ablating of aluminum after femtosecond pulsed laser machining.

Figure 21:
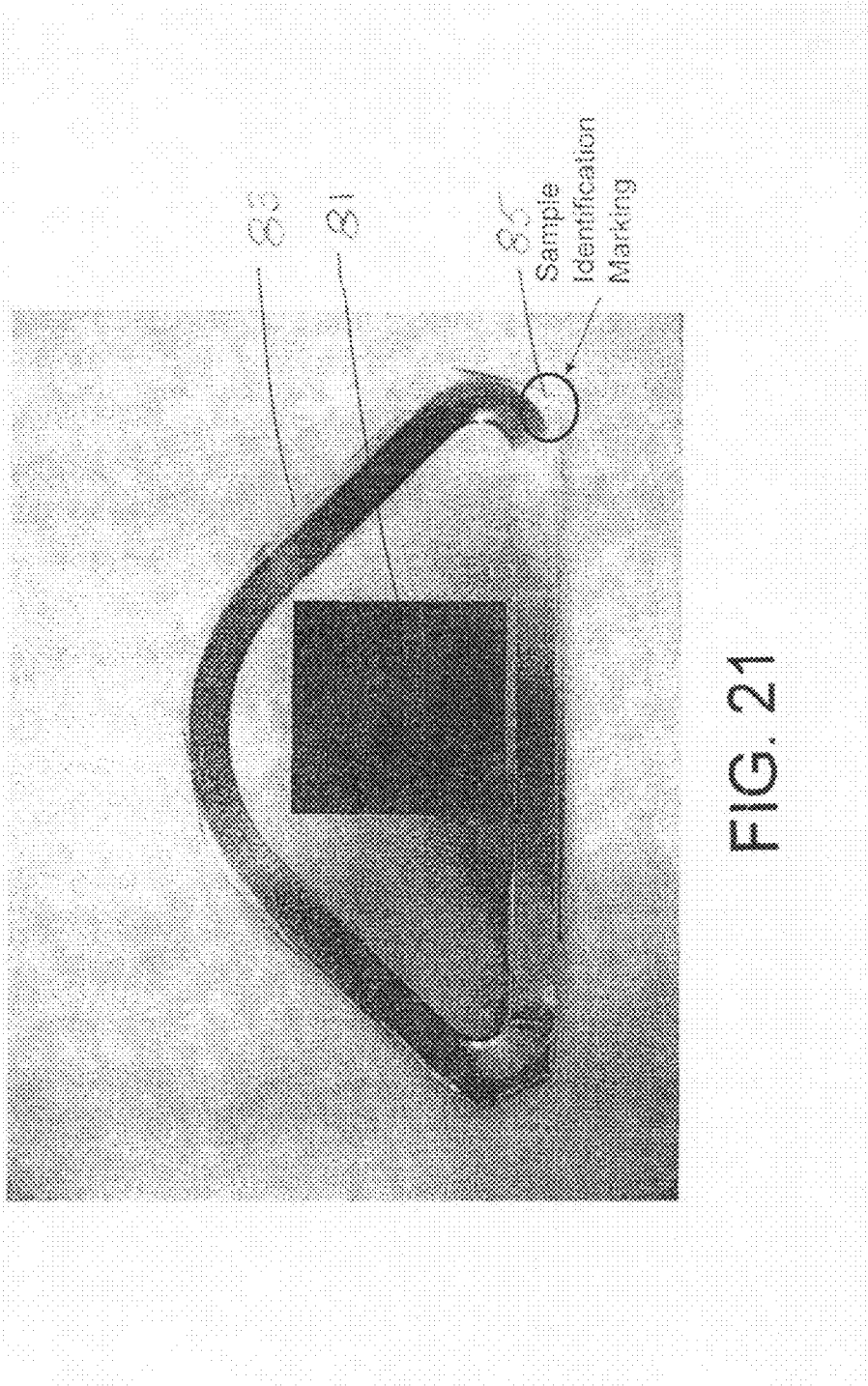
FIG. 21 is a photograph of a processed aluminum sample.

FIG. 21 is a photograph of a processed aluminum sample 81, shown in a holder 83 with a sample identification marking 85.

Figure 22:
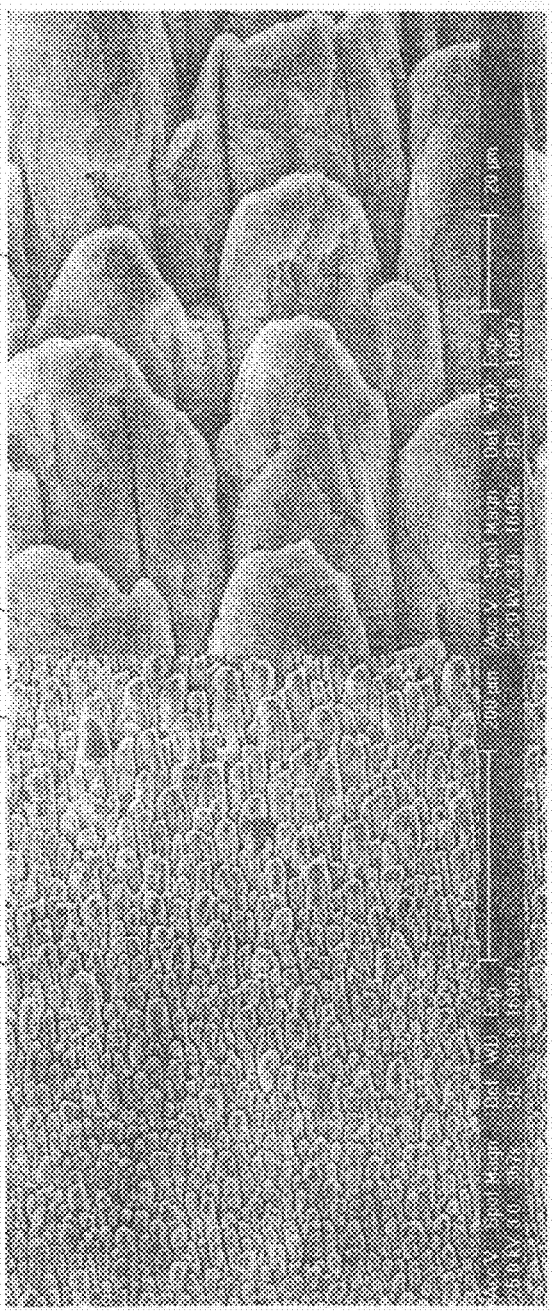
FIG. 22 shows SEM images of varied magnification of processed aluminum femtosecond pulsed laser machined at a 45° angle.

FIG. 22 shows an aluminum sample 90 at 357× magnification 91 and 1649× magnification after machining with a femtosecond pulsed laser at a 45° angle. The fish scale appearance shows great surface areas from the processing.

Figure 23:
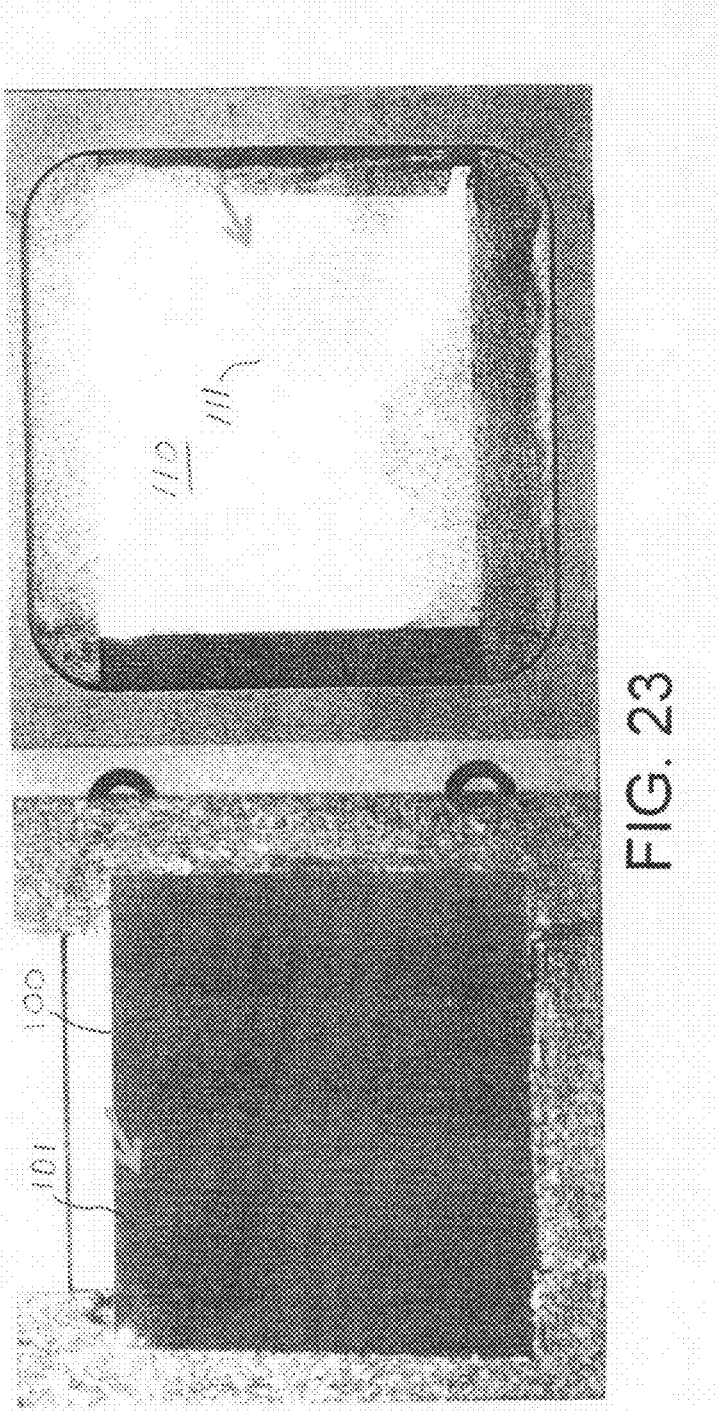
FIG. 23 shows visible images of a femtosecond pulsed laser machined carbon film.

FIG. 23 shows a carbon film 100 and a metal substrate 110. The carbon film 10 has a 15 mm square 101 that has been machined with a femtosecond pulsed laser. The metal substrate 100 has a 15 mm square 111 that has been machined with a femtosecond pulsed laser.

Figure 24:
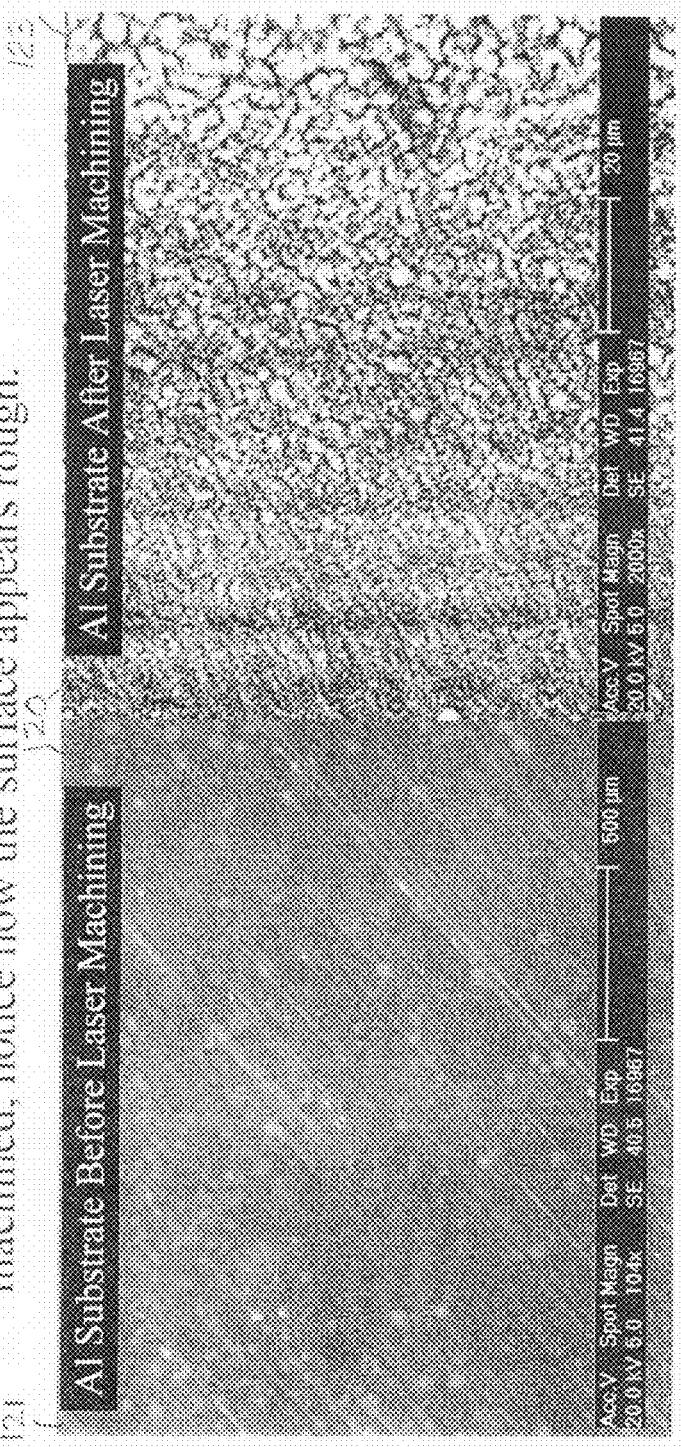
FIG. 24 shows SEM images of an aluminum substrate before and after processing with a femtosecond pulsed laser.

FIG. 24 shows SEM images of an aluminum substrate 120 before machining 121 at 104× magnification and after machining 123 at 2000× magnification, respectively. For comparison, lengths of 500 μm and 20 μm are marked.

Figure 25:
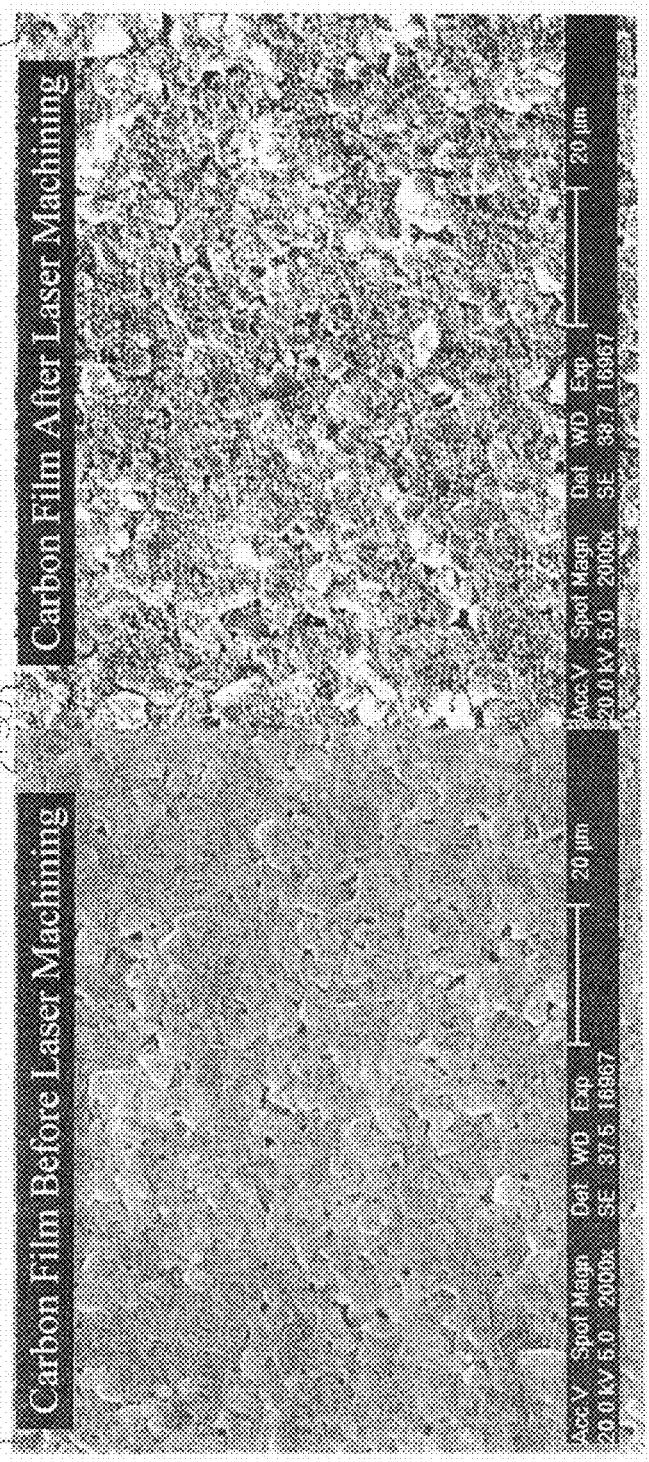
FIG. 25 shows SEM images of a carbon film on an aluminum substrate before and after processing with a femtosecond pulsed laser.

FIG. 25 shows SEM images of a carbon film 130 on a metal substrate before laser machining 131 and after laser machining 133 at 2000× magnification. The small bumps are formed by the femtosecond pulsed laser machining.

Figure 26:
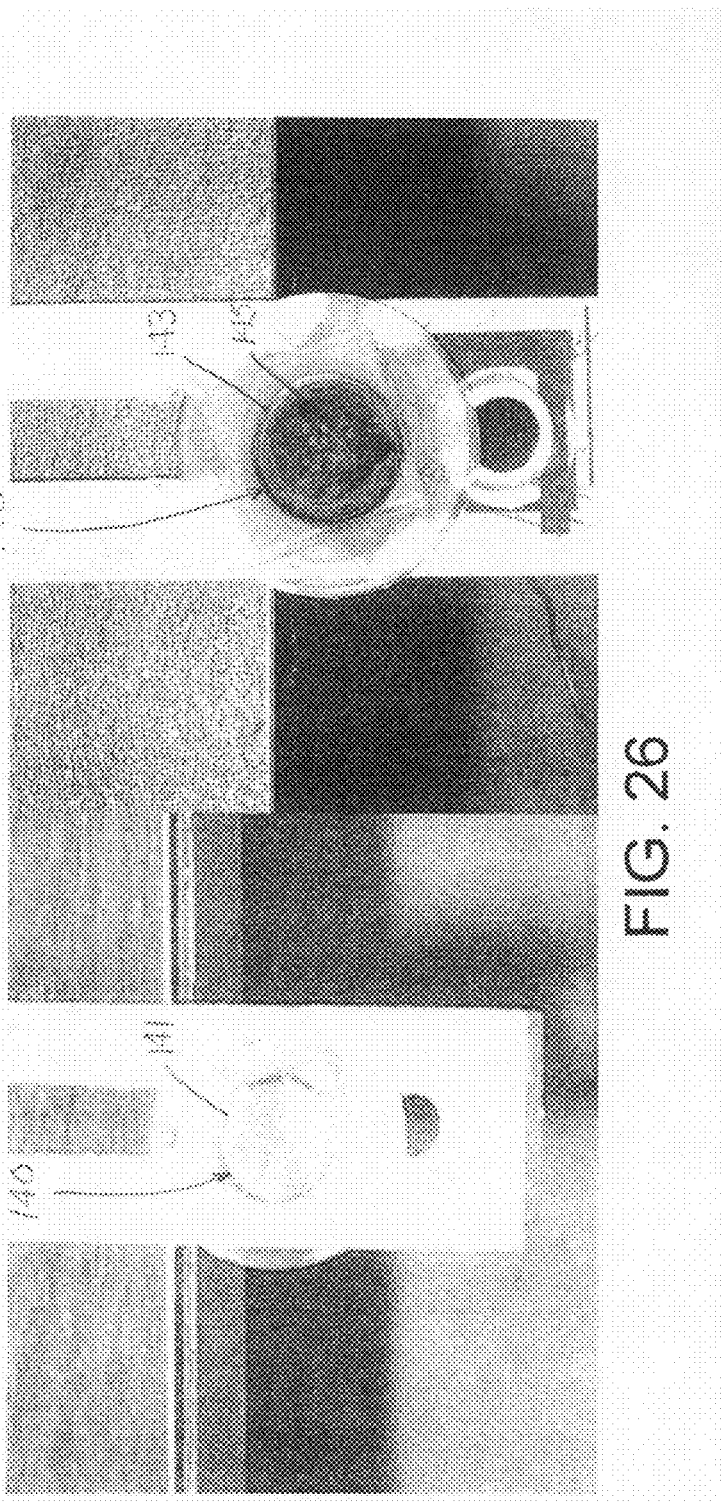
FIG. 26 shows images of a gold foil used on a supercapacitor before and after machining with a femtosecond pulsed laser.

FIG. 26 shows images of gold foil 140 before 141 and after 143 femtosecond pulsed laser machining. The dark surface 145 shows the non-reflective nature of the rough gold surface produced by femtosecond pulsed laser machining.

Figure 27:
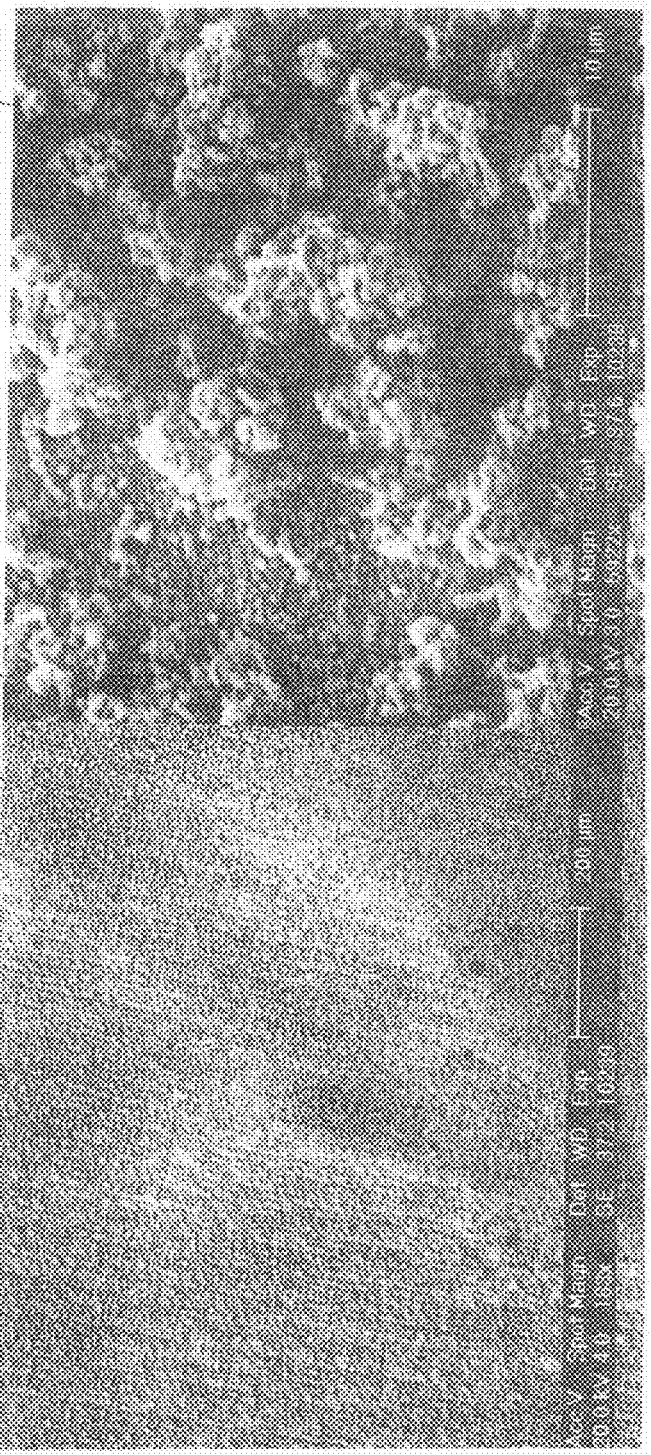
FIG. 27 shows SEM images of a femtosecond pulsed laser machined gold foil at varied magnification.

FIG. 27 shows SEM images of the femtosecond pulsed laser machined gold surface 145 at 183× magnification 147 and 5922× magnification 149. For convenience scales of 200 μm and 10 μm are shown.

Figures 28, 29:
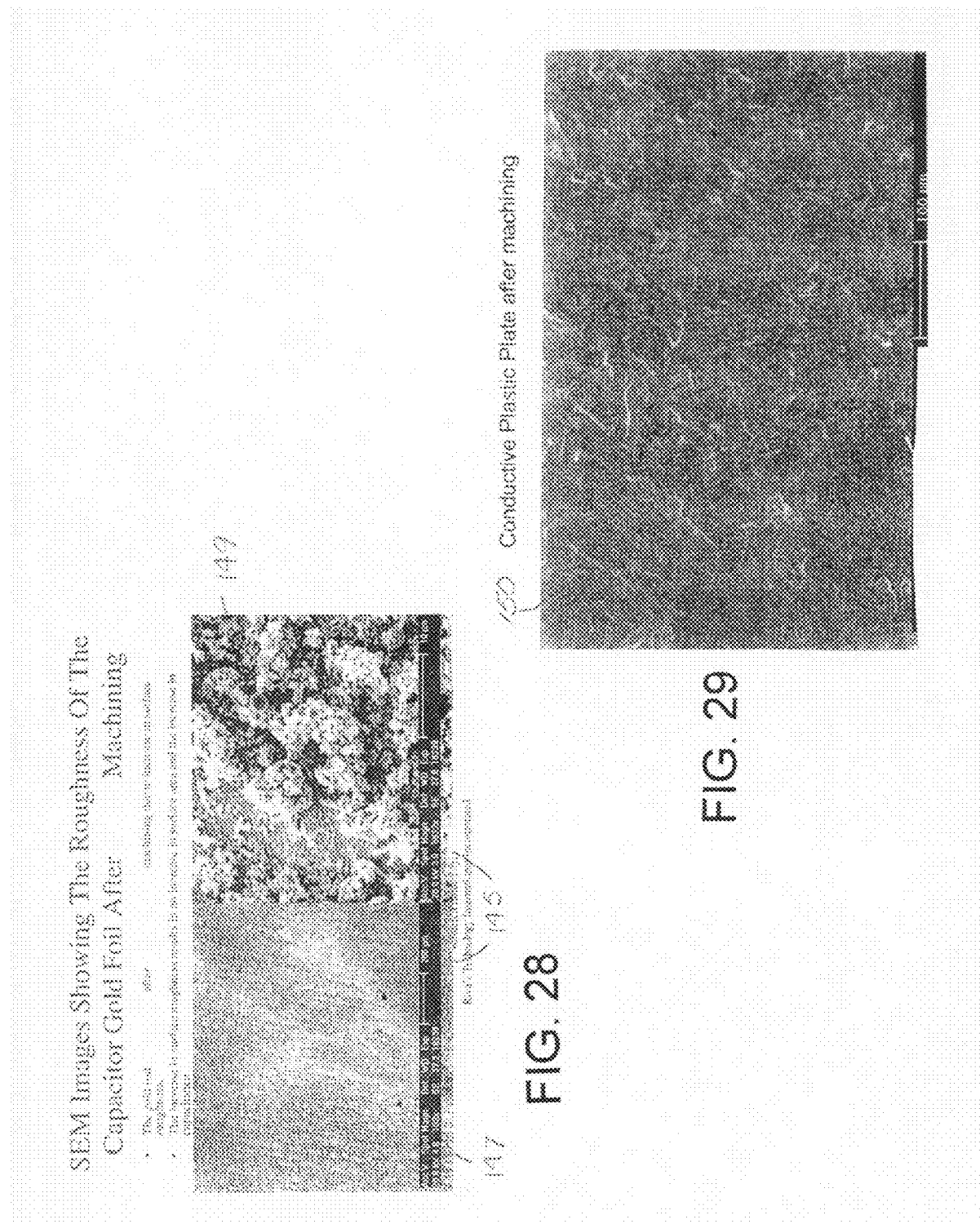
FIG. 28 shows SEM images of a femtosecond pulsed laser machined gold foil at varied magnification.
FIG. 29 shows SEM images of a femtosecond pulsed laser conductive plastic plate at varied magnification.

FIG. 28 shows in slightly different contrast SEM images of the femtosecond pulsed laser machined gold surface 145 at 183× magnification 147 and 5922× magnification 149. For convenience scales of 200 μm and 10 μm.

FIG. 29 shows a conduct plastic plate 150 after machining. For convenience a 100 μm length is marked on the SEM.

FIG. 30 shows a chart 160 of advantages of nano structuring by femtosecond pulsed laser machining of supercapacitor electrodes.

FIG. 31 provides a chart 170 comparing creating nano surfaces 171 with femtosecond pulsed laser machining and chemical vapor deposition of nano tubes and nano wires 173.

FIG. 32 is a chart 180 of applications of femtosecond pulsed laser machining applications for electronic components.

After tens of picoseconds thermal diffusion into the sample bulk takes place. After nanoseconds the onset of thermal melting and ablation occurs. Femtosecond pulse produce ablating without melting adjacent parts.

The SEM (scanning electron microscope) images showing the nano structures that were formed by the femtosecond pulsed laser machining. Ablated figures that are less than 10 nm wide.

Being machined by the femtosecond pulsed laser, the nano and microsurfaces have been created by the laser machining process. New nano surface structures have been formed by femosecond plused laser machining. 1 mm thick metals provide increased electrode surface area for hydrogen production. Increased surface area for supercapacitor electrode is provided in plastic graphite composites. Carbon films on aluminum foil substrate are femtosecond pulsed laser machined. Increased surface areas improve capacitance of supercapacitors. Increased surface area of activated carbons used in supercapacitors improves their capacities. Polymer films are machined on plastic substrates. Femtosecond plused laser enhanced surfaces are used for the detection of chemical and biological agents.

Improved power dissipation is provided for better heat management of laser diodes.

All objects emit light of different wavelength depending on their temperature. Objects at room temperature radiate in the IR. IR wavelengths are from 1 μm to 1000 μm in the EM spectrum. Objects begin to glow red when their temperature began to approach 1112° F.

A femtosecond pulse is to one second as 5 cents is to the U.S. National debt.

On a logarithmic time scale, a femtosecond laser pulse and the age of the universe are both about the same distances, $10^{15}$ and $10^{-15}$ from 1 minute.

In supercapacitors activated carbon use is limited by the size of pores. The electrons may have difficulty occupying all of the surface areas in the pores. The present invention ablates activated carbon surfaces of the electrodes to increase accessibility to pores and further to increase the surface area accessible to the stored electrons. Chemical vapor deposition of carbon nano tubes, nano wires and nano particles in conjunction with femtosecond pulsed laser ablation increases the surface area of the electrodes for storing electrons. The deposition occurs on ablated surfaces or beside ablated surfaces. The storage capacity of varied shapes of supercapacitor electrodes with curved surfaces is improved by ablating some parts of the surfaces with femtosecond pulsed lasers and chemical vapor deposition on those ablated surfaces and/or on other surfaces to form carbon nano tubes, nano wires and nano particles.

Supercapacitors have very large surface areas because of their use of porous activated carbon which has high surface area of about 1,500 to 3,000 square meters per gram in micro pores, meso pores and nano pores. Supercapacitors receive, hold and release electrical charges. Because of the high electrical charges, the supercapacitors produce much heat during charging and discharging. The heat produced is a problem that places limits on the size and uses of supercapacitors. The supercapacitors are limited by their ability to conduct heat away from the capacitors. The activated carbon electrodes and collectors are encased in metal cases, usually in aluminum cases. The femtosecond pulsed laser machining of those metal cases adds surface area to the cases and removes heat from the cases by electromagnetic wave propagation from the cases. The inner sides of the cases are femtosecond pulsed laser machined to speed heat transfer to the cases from the electrodes. The outer sides of the cases are similarly machined to radiate that away from the cases.

Fuel cells have electrodes and membranes. The efficiency of the fuel cells is improved by controlling porosity of the membranes and increasing surface area of the electrodes. The membranes are ablated using femtosecond pulsed lasers to control pore sizes. The electrodes are ablated using femtosecond pulsed laser machining to increase surface areas of the electrodes and to improve power output and reduce size to power ratios. Controlled chemical vapor deposition of carbon nano tubes, nano wires and nano particles on the fuel cell electrodes further increase the active surface areas of the electrodes, improving power output and increasing power to size ratios.

Batteries store electrical charges and due to their structures are slower to charge than capacitors, which may be disadvantageous, and slower to discharge, which may be advantageous. The present invention increases surface areas of battery electrodes making faster charging and greater storage capacity possible. The electrodes, whether they are lithium, carbon, zinc, lead, lead oxide, nickel hydroxize, cadmium or other materials have surface areas increased by ablating surfaces of the electrodes with femtosecond pulsed lasers. The surfaces may be additionally increased by chemical vapor deposition of carbon nano tubes, nano wires and nano particles on ablated or unablated surfaces. Besides increasing storage capacity, charging speed and power-to-size ratios the femtosecond ablation and chemical vapor deposition also increase the range of available shapes of electrodes for battery shape variation.

Hydrogen generation occurs in electrochemical cells having electrodes. The invention increases the surface areas of the hydrogen generation electrodes by surface ablation of the electrodes with femtosecond pulsed lasers. The increased surface area of the electrodes speeds hydrogen generation and results in small hydrogen generating cells. The surface area increases due to femtosecond pulsed laser ablation may be augmented with chemical vapor deposition of carbon nano tubes, nano wires and/or nano particles on or near the ablated surfaces of the new electrodes.

Hydrogen storage in tanks is improved in alloys and hydrides such as nickel—metal alloy hydrides in the form of plates or sheets or particles, which here are referenced to as electrodes, by increasing surface areas of the alloys with femtosecond pulsed laser ablation. The ablated surface areas may be augmented or supplemented with chemical vapor deposition of carbon nano tubes, nano wires and nano particles.

LED's emit light from p-n junctions of solid state materials, which are herein referred to as electrodes, when the electrodes are sufficiently charged. The light emitting function is improved by more rapid and greater charges on the solid state electrode materials. Increasing surfaces of those electrode materials by femtosecond pulsed laser ablation increases the charge storage capabilities, resulting in smaller and lighter LED's, and brighter LED's which consume less power. The charge storing capabilities of the LED electrodes is increased by chemical vapor deposition of carbon nano tubes, nano wires and nano particles on the electrodes and on or near the femtosecond pulsed laser machined surfaces.

Fluorescent lamps, vapor lamps and high intensity discharge lamps and arc lamps use electrodes to excite gas, cause an arc and/or generate a plasma. The surface areas of the electrodes are significant in relation to the power necessary to start and to maintain the light generation. The light emitting functions of the lamps and the power consumption are improved by increasing surface areas of the electrodes and decreasing size of the electrodes and lamps. The increasing surface of the electrodes is effected by controlled ablating of the surfaces with femtosecond pulsed laser machining.

Chemical, biochemical and biological sensors have support surfaces carrying materials which are reactive to targeted chemicals, biochemicals or biological agents. The support surfaces are herein referred to as electrodes. In some cases signals related to detected presence of targeted substances are communicated by changed characteristics of the electrodes. In other cases reactive materials on the electrodes are excited by power applied to the electrodes or by irradiation of the reactive materials.

The effectiveness of the chemical, biochemical and biological sensors requires a surface area to carry the reactive material. Increasing the surface area of the carrying electrodes improves the performance. The surface area of the electrodes is increased by ablating the surfaces with femtosecond pulsed laser machining. The surface areas may be further increased by chemical vapor deposition of carbon nano tubes, nano wires or nano particles on some of the femtosecond pulsed laser machined surfaces or adjacent to and in addition to the laser machined surface.

Shielding conductive screens uses conductive materials imbedded in plastic materials. The shielding is improved by femtosecond pulsed laser machining of the screens or conductive materials imbedded in the plastic materials to increase by many times the surface areas of the conductive screens and materials, thus increasing their shielding functions by many times.

While the invention has been described with reference to the specific embodiments, modifications and variations of the invention may be constructed without departing from the scope of the invention, which is defined in the following claims.

I claim:

1. Apparatus comprising electronic components, elements and electrodes having increased active energy receiving, storing and releasing surfaces with nanometer surface irregularities machined by femtosecond pulsed laser machining.

2. The apparatus of claim 1, wherein the electronic components comprise housings and internal housing surfaces having femtosecond pulsed laser machined surfaces for increasing energy transfer of electronic components, elements and electrodes therein.

3. The apparatus of claim 1, wherein the electronic components comprise capacitors, and the energy receiving storing and releasing surfaces comprise opposite electrode surfaces for storing energy having femtosecond pulsed laser machined surfaces for storing and discharging the energy.

4. The apparatus of claim 1, wherein the electronic components comprise lighting electrodes and wherein the surfaces of the lighting electrodes comprise femtosecond pulsed laser machined lighting electrode surfaces for enhanced lumen emission.

5. The apparatus of claim 1, wherein the electronic components comprise fluorescent light electrodes, and the energy receiving, storing and releasing surfaces comprise femtosecond pulsed laser machined arc generating electrode surfaces for starting and sustaining an arc or activating a vapor for activation of fluorescing coatings.

6. The apparatus of claim 1, wherein the electronic components comprise biological or chemical sensors and the energy receiving, storing and releasing surfaces comprise femtosecond pulsed laser machined reactive material carrying electrode surfaces.

7. The apparatus of claim 1, wherein the electronic components comprise light emitting diodes and the energy receiving, storing and releasing surfaces comprise femtosecond pulsed laser machined diode electrode surfaces.

8. The apparatus of claim 1, wherein the electronic components comprise fuel cells and the energy receiving, storing and releasing surfaces comprise femtosecond pulsed laser machined fuel cell electrode surfaces.

9. The apparatus of claim 1, wherein the electronic components comprise batteries and the energy receiving, storing and releasing surfaces comprise femtosecond pulsed laser machined storage electrode surfaces in voltaic cells in the batteries.

10. The apparatus of claim 1, wherein the electronic components comprise hydrogen generator and the energy receiving, storing and releasing surfaces comprise femtosecond pulsed laser machined electrodes surfaces in electrolytic cells.

11. The apparatus of claim 1, having the energy receiving, storing and releasing surfaces further comprising vapor deposited nano structures for surface energy increasing.

12. The apparatus of claim 11, wherein the energy receiving, storing and releasing surfaces are outer surfaces on supercapacitors.

13. The apparatus of claim 11, wherein the energy receiving, storing and releasing surfaces machined by femtosecond laser pulsed lasers and the surfaces with vapor deposited nano structures are distinct surfaces.

14. The apparatus of claim 1, wherein the femtosecond pulsed laser machined surfaces are on thin foils connected to the electronic components.

15. The apparatus of claim 1, wherein the femtosecond pulsed laser machined surfaces are on thin foils connected to the supercapacitors.

16. Apparatus comprising energy storing and releasing components having energy storing and releasing irregular surfaces enhanced for storing and releasing energy by femtosecond laser pulsed machining.

17. The apparatus of claim 16, wherein the components are hydrogen storing tanks and wherein the energy storing and releasing surfaces are hydrogen storing porous surfaces enhanced for storing and releasing energy by femtosecond laser pulsed machining.

* * * * *